(12) United States Patent
Sanso

(10) Patent No.: US 10,395,024 B2
(45) Date of Patent: Aug. 27, 2019

(54) AUTHENTICATION FOR ONLINE CONTENT USING AN ACCESS TOKEN

(71) Applicant: Adobe Inc., San Jose, CA (US)

(72) Inventor: Antonio Sanso, Allschwil (CH)

(73) Assignee: Adobe Inc., San Jose, CA (US)

( * ) Notice: Subject to any disclaimer, the term of this patent is extended or adjusted under 35 U.S.C. 154(b) by 130 days.

(21) Appl. No.: 14/196,728

(22) Filed: Mar. 4, 2014

(65) Prior Publication Data

US 2015/0254441 A1 Sep. 10, 2015

(51) Int. Cl.
G06F 21/31 (2013.01)
G06F 21/41 (2013.01)

(52) U.S. Cl.
CPC ............................... G06F 21/41 (2013.01)

(58) Field of Classification Search
CPC ............ G06F 21/31; H04L 29/06; G06F 21/62
USPC ................................................ 726/9, 4, 6, 7
See application file for complete search history.

(56) References Cited

U.S. PATENT DOCUMENTS

| | | |
|---|---|---|
| 7,237,268 B2 | 6/2007 | Fields |
| 7,254,235 B2 | 8/2007 | Boudreault |
| 7,266,839 B2 | 9/2007 | Bowers et al. |
| 7,343,014 B2 | 3/2008 | Sovio et al. |
| 7,526,650 B1 | 4/2009 | Wimmer |
| 7,567,987 B2 | 7/2009 | Shappell et al. |
| 7,720,767 B2 | 5/2010 | Ta et al. |
| 7,802,293 B2 | 9/2010 | Boyer et al. |
| 8,074,290 B2 | 12/2011 | Nakano et al. |
| 8,196,194 B2 | 6/2012 | Lindholm |
| 8,250,145 B2 | 8/2012 | Zuckerberg |
| 8,280,959 B1 | 10/2012 | Zuckerberg |
| 8,336,090 B2 | 12/2012 | Ache et al. |
| 8,402,555 B2 | 3/2013 | Grecia |
| 8,473,429 B2 | 6/2013 | Cheng et al. |
| 8,533,860 B1 | 9/2013 | Grecia |
| 8,543,660 B2 | 9/2013 | Roberts |
| 8,549,300 B1 | 10/2013 | Kumar et al. |
| 8,615,794 B1 * | 12/2013 | Tomilson ............... G06F 21/44 713/182 |
| 8,661,255 B2 | 2/2014 | Pedlow et al. |
| 8,887,308 B2 | 11/2014 | Grecia |
| 9,038,138 B2 | 5/2015 | Trammel et al. |

(Continued)

FOREIGN PATENT DOCUMENTS

| | | |
|---|---|---|
| CN | 101006428 | 7/2007 |
| EP | 1939781 | 7/2008 |

OTHER PUBLICATIONS

"Advisory Action", U.S. Appl. No. 13/397,517, Dec. 26, 2012, 3 pages.

(Continued)

Primary Examiner — Haresh N Patel
(74) Attorney, Agent, or Firm — SBMC

(57) ABSTRACT

Techniques for authentication for online content using an access token are described. According to various embodiments, online content (e.g., webpages and other types of web content) can be served across a variety of different online resources. According to one or more embodiments, an access token is leveraged to enable a user to authenticate with multiple different distributed content resources for access to online content, and without requiring the user to input authentication credentials for each of the content resources.

20 Claims, 9 Drawing Sheets

(56) References Cited

U.S. PATENT DOCUMENTS

| | | |
|---|---|---|
| 9,160,720 B2 | 10/2015 | Pedlow et al. |
| 2003/0097564 A1 | 5/2003 | Tewari et al. |
| 2003/0182551 A1 | 9/2003 | Frantz et al. |
| 2003/0217267 A1 | 11/2003 | Kindberg |
| 2005/0065891 A1 | 3/2005 | Lee et al. |
| 2005/0066353 A1 | 3/2005 | Fransdonk |
| 2005/0091507 A1 | 4/2005 | Lee |
| 2005/0152551 A1* | 7/2005 | Defreese ............ H04L 63/0428 380/255 |
| 2007/0266095 A1 | 11/2007 | Billsus et al. |
| 2008/0010685 A1 | 1/2008 | Holtzman et al. |
| 2008/0040283 A1 | 2/2008 | Morris |
| 2008/0077462 A1* | 3/2008 | Patel ................ G06Q 20/108 705/7.33 |
| 2008/0083025 A1 | 4/2008 | Meijer et al. |
| 2008/0091763 A1 | 4/2008 | Devonshire et al. |
| 2008/0134316 A1 | 6/2008 | Devonshire et al. |
| 2009/0034557 A1* | 2/2009 | Fluhrer ............. H04L 41/0893 370/474 |
| 2009/0083541 A1 | 3/2009 | Levine |
| 2009/0100060 A1 | 4/2009 | Livnat et al. |
| 2009/0249439 A1 | 10/2009 | Olden et al. |
| 2009/0293108 A1 | 11/2009 | Weeden |
| 2009/0304009 A1 | 12/2009 | Kolhi et al. |
| 2009/0307361 A1 | 12/2009 | Issa et al. |
| 2010/0010944 A1 | 1/2010 | Cheng et al. |
| 2010/0034389 A1 | 2/2010 | Sakharov |
| 2010/0083351 A1 | 4/2010 | Ryder |
| 2010/0100899 A1 | 4/2010 | Bradbury et al. |
| 2010/0185868 A1 | 7/2010 | Grecia |
| 2010/0248698 A1 | 9/2010 | In et al. |
| 2010/0257363 A1 | 10/2010 | Kiran et al. |
| 2010/0325199 A1 | 12/2010 | Park et al. |
| 2010/0325422 A1 | 12/2010 | Gnanasambandam et al. |
| 2010/0332456 A1 | 12/2010 | Prahlad et al. |
| 2011/0016119 A1 | 1/2011 | Kodialam et al. |
| 2011/0093941 A1 | 4/2011 | Liu et al. |
| 2011/0099382 A1 | 4/2011 | Grecia |
| 2011/0099616 A1 | 4/2011 | Mazur et al. |
| 2011/0099623 A1* | 4/2011 | Garrard ................ H04L 63/126 726/14 |
| 2011/0119738 A1 | 5/2011 | Piepenbrink et al. |
| 2011/0154212 A1 | 6/2011 | Gharpure et al. |
| 2011/0208695 A1 | 8/2011 | Anand |
| 2011/0209064 A1 | 8/2011 | Jorgensen et al. |
| 2011/0225640 A1 | 9/2011 | Ganapathy et al. |
| 2011/0231660 A1 | 9/2011 | Kanungo |
| 2011/0231670 A1 | 9/2011 | Shevchenko |
| 2011/0265157 A1 | 10/2011 | Ryder |
| 2011/0288946 A1 | 11/2011 | Baiya et al. |
| 2011/0313898 A1 | 12/2011 | Singhal |
| 2011/0320345 A1 | 12/2011 | Taveau et al. |
| 2012/0030318 A1 | 2/2012 | Ryder |
| 2012/0041829 A1 | 2/2012 | Rothschild |
| 2012/0042160 A1 | 2/2012 | Nakhjiri et al. |
| 2012/0079095 A1 | 3/2012 | Evans et al. |
| 2012/0079126 A1 | 3/2012 | Evans et al. |
| 2012/0079276 A1 | 3/2012 | Evans |
| 2012/0079606 A1 | 3/2012 | Evans |
| 2012/0095871 A1 | 4/2012 | Dorsey |
| 2012/0095906 A1 | 4/2012 | Dorsey |
| 2012/0095916 A1 | 4/2012 | Dorsey |
| 2012/0096497 A1 | 4/2012 | Xiong et al. |
| 2012/0102317 A1 | 4/2012 | Mathur et al. |
| 2012/0102329 A1 | 4/2012 | Mittal et al. |
| 2012/0130903 A1 | 5/2012 | Dorsey |
| 2012/0150727 A1 | 6/2012 | Nuzzi |
| 2012/0151220 A1 | 6/2012 | Grecia |
| 2012/0166333 A1 | 6/2012 | von Behren et al. |
| 2012/0166522 A1 | 6/2012 | MacLaurin et al. |
| 2012/0173333 A1 | 7/2012 | Berger |
| 2012/0173431 A1 | 7/2012 | Ritchie et al. |
| 2012/0173625 A1 | 7/2012 | Berger |
| 2012/0180109 A1 | 7/2012 | Chen |
| 2012/0191553 A1 | 7/2012 | Sathe |
| 2012/0239529 A1 | 9/2012 | Low et al. |
| 2012/0254340 A1 | 10/2012 | Velummylum et al. |
| 2012/0255033 A1 | 10/2012 | Dwivedi |
| 2012/0290376 A1 | 11/2012 | Dryer et al. |
| 2012/0296741 A1 | 11/2012 | Dykes |
| 2012/0310828 A1 | 12/2012 | Hu |
| 2013/0007208 A1 | 1/2013 | Tsui et al. |
| 2013/0007892 A1 | 1/2013 | Inooka |
| 2013/0145161 A1 | 6/2013 | Pedlow et al. |
| 2013/0254115 A1 | 9/2013 | Pasa et al. |
| 2013/0283364 A1 | 10/2013 | Chang et al. |
| 2013/0297504 A1 | 11/2013 | Nwokolo et al. |
| 2013/0299596 A1 | 11/2013 | Choi et al. |
| 2013/0332293 A1 | 12/2013 | Ran |
| 2013/0346222 A1 | 12/2013 | Ran |
| 2014/0019367 A1 | 1/2014 | Khan et al. |
| 2014/0082350 A1* | 3/2014 | Zarfoss, III ........... H04L 63/083 713/155 |
| 2014/0089186 A1 | 3/2014 | Dunn et al. |
| 2014/0090081 A1* | 3/2014 | Mattsson ............ G06F 21/6218 726/27 |
| 2014/0095874 A1* | 4/2014 | Desai .................. H04L 63/0815 713/168 |
| 2014/0096177 A1* | 4/2014 | Smith .................... H04L 63/08 726/1 |
| 2014/0099886 A1 | 4/2014 | Monroe |
| 2014/0156989 A1* | 6/2014 | Lalwani ................ H04L 9/0894 713/155 |
| 2014/0181525 A1 | 6/2014 | Pedlow et al. |
| 2014/0189799 A1* | 7/2014 | Lu ............................ H04L 63/08 726/4 |
| 2014/0196115 A1* | 7/2014 | Pelykh .................... H04L 63/08 726/4 |
| 2014/0214664 A1 | 7/2014 | Kim et al. |
| 2014/0245411 A1* | 8/2014 | Meng .................... H04L 63/08 726/7 |
| 2014/0279566 A1 | 9/2014 | Verma et al. |
| 2014/0289408 A1* | 9/2014 | Ishino .................... H04L 63/10 709/225 |
| 2014/0304778 A1 | 10/2014 | Grecia |
| 2014/0331060 A1* | 11/2014 | Hayton .................. G06F 21/31 713/186 |
| 2015/0039444 A1* | 2/2015 | Hardin ............... G06Q 30/0273 705/14.69 |
| 2015/0106881 A1* | 4/2015 | Wharton .................. H04L 63/08 726/4 |
| 2015/0143134 A1* | 5/2015 | Hashimoto ......... G06F 21/6209 713/193 |
| 2015/0150110 A1* | 5/2015 | Canning ............. H04L 63/0807 726/9 |
| 2015/0186668 A1* | 7/2015 | Whaley ............... G06F 21/6218 713/156 |
| 2015/0254441 A1* | 9/2015 | Sanso .................... G06F 21/41 726/9 |
| 2015/0304268 A1* | 10/2015 | Byttow .................. G06Q 50/01 709/206 |

OTHER PUBLICATIONS

"EMV Payment Tokenisation Specification", Technical Framework—Version 1.0, Mar. 2014, 84 pages.

"Final Office Action", U.S. Appl. No. 13/397,517, Nov. 26, 2012, 19 pages.

"Information Supplement: PCI DSS Tokenization Guidelines", Security Standards Council—Scoping SIG, Tokenization Taskforce PCI Security Standards Council, Aug. 2011, 23 pages.

"Non-Final Office Action", U.S. Appl. No. 13/397,517, May 31, 2012, 19 pages.

"Notice of Allowance", U.S. Appl. No. 13/397,517, Feb. 4, 2013, 22 pages.

"Notice of Allowance", U.S. Appl. No. 13/740,086, May 31, 2013, 21 pages.

"Notice of Allowance", U.S. Appl. No. 13/888,051, Sep. 19, 2014, 12 pages.

"Petition for Inter Partes Review", U.S. Pat. No. 8,887,308, 58 pages.

(56) References Cited

OTHER PUBLICATIONS

"Technologies for Payment Fraud Prevention: EMV, Encryption and Tokenization", A Smart Card Alliance Payments Council White Paper, Oct. 2014, 34 pages.
Baiya,"Method and System of Managing Digital Multimedia Content", U.S. Appl. No. 61/307,196, filed Feb. 23, 2010, 25 pages.
Liu,"A license-sharing scheme in Digital Rights Management", School of Informatics Technology and Computer Science, 2004, 13 pages.
"Non-Final Office Action", U.S. Appl. No. 13/312,184, dated Mar. 13, 2013, 11 pages.
"Notice of Allowance", U.S. Appl. No. 13/888,051, dated Sep. 19, 2014, 12 pages.
"IPTV Security: Protecting High-Value Digital Contents", John Wiley & Sons Ltd., Chichester, England, Mar. 2008, 255 pages.
"Notice of Allowance", U.S. Appl. No. 14/189,914, dated Jun. 11, 2015, 5 pages.
"Non-Final Office Action", U.S. Appl. No. 14/189,914, dated Oct. 2, 2014, 6 pages.
"Final Office Action", U.S. Appl. No. 14/189,914, dated Mar. 20, 2015, 7 pages.
"Notice of Allowance", U.S. Appl. No. 13/312,184, dated Dec. 19, 2013, 7 pages.
"Notice of Allowance", U.S. Appl. No. 13/312,184, dated Oct. 9, 2013, 8 pages.
Kravitz,"Achieving Media Portability Through Local Content Translation and End-to-End Rights Management", Nov. 2005, 10 pages.
"Advisory Action", U.S. Appl. No. 12/766,337, dated Mar. 12, 2015, 5 pages.
"Final Office Action", U.S. Appl. No. 12/766,337, dated Dec. 29, 2014, 13 pages.
"International Preliminary Report on Patentability", Application No. PCT/US2011/030329, dated Jun. 27, 2012, 5 pages.
"International Search Report and Written Opinion", Application No. PCT/US2011/030329, dated Jul. 22, 2011, 10 pages.
"Non-Final Office Action", U.S. Appl. No. 12/766,337, dated Mar. 20, 2014, 12 pages.
"Non-Final Office Action", U.S. Appl. No. 12/766,337, dated May 29, 2012, 17 pages.
"Non-Final Office Action", U.S. Appl. No. 12/766,337, dated Sep. 4, 2015, 14 pages.
"Notice of Allowance", U.S. Appl. No. 12/766,337, dated Feb. 28, 2013, 13 pages.
"Notice of Allowance", U.S. Appl. No. 12/766,337, dated Dec. 17, 2015, 5 pages.
"Second Written Opinion", Application No. PCT/US2011/030329, dated Apr. 4, 2012, 5 pages.
Cassella,"Apple iTunes Cloud Coming in 2010, Says Robertson", Digitaltrends.com, Jan. 19, 2010, 2 pages.
Garfinkel,"Email-Based Identification and Authentication: An Alternative to PKI?", IEEE Security & Privacy, http://computer.org/security/, Nov. 2003, 7 pages.
Kortina,"How-To: One iTunes Library With Multiple Computers", gigaom.com, 101/Mar. 2008, 6 pages.
Landau,"Confused about iTunes Home Sharing?", the Mac Observer, Oct. 15, 2009, 3 pages.
Mell,"The NIST Definition of Cloud Computing", Oct. 7, 2009, 2 pages.

\* cited by examiner

AUTHENTICATION FOR ONLINE CONTENT USING AN ACCESS TOKEN

BACKGROUND

Today's computer user has access to a wide variety of online content, such as web pages, social media, documents, data, applications, services, media (e.g., video and audio), files, and so forth. Online content is increasingly being served to users via distributed resources, e.g., via cloud-based resource architectures. Managing and serving online content in a distributed environment, however, presents a number of implementation challenges.

One such challenge pertains to user authentication for access to online content that is served across distributed resources. For instance, managing user authentication for an instance of content that is served across multiple resources (e.g., servers) is difficult since multiple different resources each with their own particular authentication requirements may be involved.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for authentication for online content using an access token are described. According to various embodiments, online content (e.g., webpages and other types of web content) can be served across a variety of different online resources. According to one or more embodiments, an access token is leveraged to enable a user to authenticate with multiple different distributed content resources for access to online content, and without requiring the user to input authentication credentials for each of the content resources.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
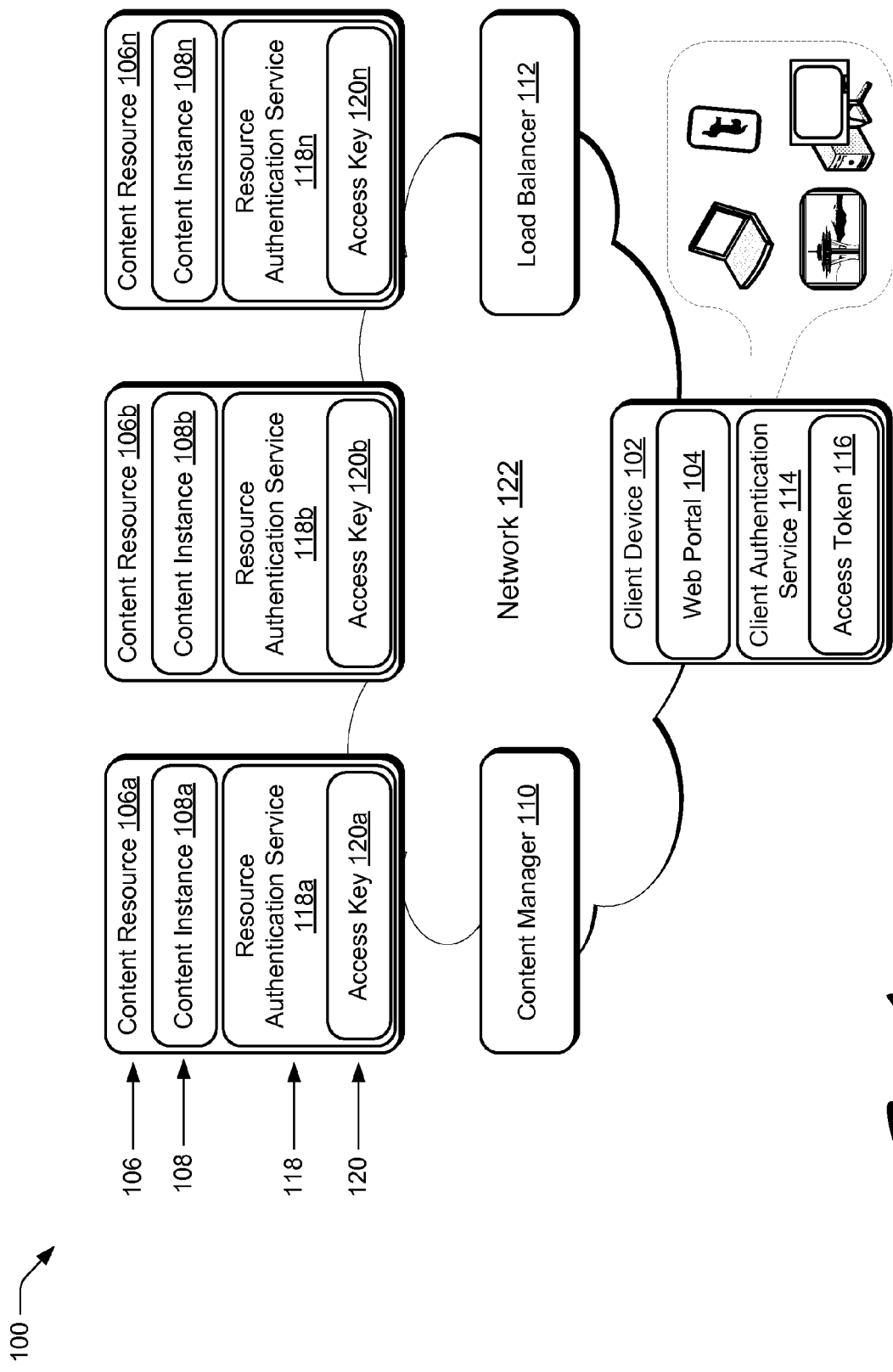
FIG. 1 is an illustration of an environment in an example implementation that is operable to employ techniques discussed herein in accordance with one or more embodiments.

Techniques for authentication for online content using an access token are described. According to various embodiments, online content (e.g., webpages and other types of web content) can be served across a variety of different online resources. For example, instances of a particular web page may be available from facilities across the world. Examples of such facilities include cloud-based data facilities, data centers, enterprise facilities, and so forth. Enabling an instance of online content to be served from multiple different online resources enables more online consumers to be served and lessens the burden on individual resources.

According to one or more embodiments, an access token is leveraged to enable a user to authenticate with multiple different distributed content resources for access to online content, and without requiring the user to input authentication credentials for each of the content resources. For instance, consider an example implementation scenario where a user requests access to a website, such as by browsing to the website via a web browser. The user's device is directed to a particular content resource (e.g., a cloud-based server) that hosts instances of the website.

As part of fulfilling the request, the content resource queries the user for user credentials. The user, for instance, is prompted to provide a username and password. The username and password may correspond to an existing user account with the website, or may be further to creating a new user account with the website. The user provides their username and password and is authenticated for access to the website. The content resource, for instance, provides an instance of the website to the user's device.

Further to the example scenario, the content resource generates an access token utilizing the user's credentials. The access token, for instance, is generated by creating a data message that includes the user's credentials as well as other types of information, examples of which are discussed below. In at least some embodiments, the message is created as at least part of a JavaScript Object Notation (JSON) web token (JWT). As detailed below, the message is processed in various ways to generate the access token, such as by applying a cryptographic hash function to the message utilizing an access key, e.g., a private cryptographic key. The access token is then communicated to the user's device.

According to various embodiments, the access token may be leveraged to authenticate the user for subsequent access to the website. For instance, consider that the user makes a subsequent request for access to the website, such as at a later date. In response to the subsequent request, the user's device is directed to a different content resource. For example, based on load balancing and/or other considerations, the different content resource is designated to serve an instance of the website to the user's device. As part of the subsequent request, the user's device participates in an authentication procedure with the different content resource.

The user's device, for instance, communicates the access token to the different content resource.

Further to the example scenario, the different content resource applies a cryptographic hash function to the access token and utilizing a version of the access key maintained by the different content resource. In at least some embodiments, the cryptographic hash function applied by the different content resource is the same function used to generate the original access token. The cryptographic hash function indicates that the access token is valid, e.g., has not been altered and/or tampered with. Thus, the different content resource retrieves the user credentials from the access token and utilizes the credentials to sign in (e.g., log in) the user to the user's account with the website. An instance of the website is then served to the user's device from the different content resource.

According to one or more embodiments, the access token is used to authenticate the user with the different content resource, even if the user has not previously authenticated with the different content resource. Further, the authentication occurs without requiring input from the user. For instance, the user is not prompted for user credentials as part of the authentication with the different content resource.

Thus, techniques discussed herein enable seamless user authentication across multiple different content resources and without requiring user interaction during each authentication. Further, content resources are not required to maintain authentication information for individual users. For instance, individual content resources may simply maintain an instance of a common access key that can be used to validate access tokens and retrieve user credentials from the access tokens.

In the following discussion, an example environment is first described that is operable to employ techniques for authentication for online content using an access token described herein. Next, a section entitled "Example Implementation Scenarios" describes some example implementation scenarios in accordance with one or more embodiments. Following this, a section entitled "Example Procedures" describes some example methods in accordance with one or more embodiments. Finally, a section entitled "Example System and Device" describes an example system and device that are operable to employ techniques discussed herein in accordance with one or more embodiments.

Example Environment

FIG. 1 is an illustration of an environment 100 in an example implementation that is operable to employ techniques for authentication for online content using an access token discussed herein. Environment 100 includes a client device 102, which is representative of various types and form factors of devices that can consume online content. The client device 102 may be configured in a variety of ways, such as a traditional computer (e.g., a desktop personal computer, laptop computer, and so on), a mobile station, an entertainment appliance, a smartphone, a netbook, a game console, a handheld device (e.g., a tablet), and so forth.

The client device 102 includes a web portal 104 which is representative of functionality to enable access to online content. The web portal 104, for instance, represents a web browser and/or other web platform application that can process various types of web-based content. This is not intended to be limiting, however, and the web portal 104 generally represents any suitable functionality for accessing and/or interacting with online content in various ways. The web portal 104, for instance, represents a GUI for accessing and interacting with online content.

The environment 100 further includes a number of content resources 106 which are representative of functionality to store and/or provide access to instances of online content. The content resources 106, for example, store instances of online content and enable the instance of online content to be accessed by the client device 102 via the web portal 104. In this particular example, the content resources 106 includes a content resources 106a, 106b, and 106n. It is to be appreciated, however, that any number and type of content resources may be employed in accordance with various embodiments.

The content resources 106 may be implemented in various ways, and generally represent collections of hardware and functionality to managing access to online content. Examples of the content resources 106 include data centers, distributed computing networks, server farms, and so on. In at least some embodiments, the content resources 106 each represent independent storage and/or access facilities. This is not intended to be limiting, however, and in at least some embodiments multiple different content resources 106 may be commonly owned, managed, and so forth.

Further to the environment 100, each of the content resources 106 includes a respective instance of online content 108. Examples of the online content include web pages, web content, social media, documents, data, applications, services, images, media (e.g., video and audio), files, and so forth. For example, the content resource 106a includes a content instance 108a, the content resource 106b includes a content instance 108b, and the content resource 106n includes a content instance 108n. According to one or more embodiments, the content instances 108 represent different instances of the same online content. As further detailed below, having different instances of the online content 108 maintained at the different content resources 106 enables the burden of providing access to the online content 108 to be shared. This is particularly useful for online content that may be accessed by multiple entities at a time, such as websites, web services, and so forth.

The environment 100 further includes a content manager 110, which is representative of functionality to manage various attributes of the online content 108. Examples of the content manager 110 include a website, a web service, a web developer, an online content source, and so forth. The content manager 110, for example, represents an entity that generates the instances of the online content 108 and propagates the instances to the content resources 106. The content manager 110 is further capable of managing versions of the online content 108, e.g., via updates to the content instances. For example, the content manager 110 may enable changes (e.g., updates) to be propagated to the different content instances such that the content instances are synchronized, e.g., such that the content instances 108a-108n represent the same version of the online content 108.

In at least some embodiments, the content resources 106 represent entities and/or enterprises that are separate and distinct from the content manager 110. The content manager 110, for example, may enter into a relationship (e.g., an enterprise contract) with the content resources 106 whereby the content resources 106 host instances of the online content 108 for the content manager 110. Alternatively or additionally, some or all of the content resources 106 may be partially or wholly managed by the content manager 110.

A load balancer 112 is also provided, which is representative of functionality to managing and distributing workloads across the content resources 106, as well as other resources. The load balancer 112, for example, can route and reroute requests for the online content 108 between the different content resources 106. In at least some embodiments, this enables the load balancer 112 to distribute the burden of providing access to the online content 108 among the different content resources 106. For instance, if the content resource 106a is currently handling many requests for the online content 108 and/or other tasks, the load balancer may route an incoming request for the online content to another of the content resources 106 that may have available processing and/or data transmission bandwidth.

According to one or more embodiments, the load balancer 112 includes functionality for tracking current workload capabilities and workload levels for the content resources 106. The load balancer 112, for example, can track available memory bandwidth, processing bandwidth, data storage, data transmission bandwidth, and so forth, for the content resources 106. This enables the load balancer 112 to make intelligent decisions regarding routing of various tasks and requests, such as requests from the client device 102 and/or other entities for the online content 108.

According to one or more embodiments, the load balancer 112 may be implemented and/or managed by various entities, such as the content manager 110, by one or more of the content resources 106, by an Internet service provider (ISP), and so forth.

The client device 102 further includes a client authentication service 114 which maintains and/or has access to an access token 116. Generally, the client authentication service 114 is representative of functionality to perform various authentication tasks for the client device 102. As further detailed below, for instance, the client authentication service 114 may utilize the access token 116 to authenticate the client device 102 with the content resources 106, such as for access to the online content 108.

To enable authentication of the client device 102 with the content resources 106, the content resources 106 include respective instances of resource authentication services 118, which in turn maintain and/or have access to respective instances of access keys 120. As further detailed below, the resource authentication services 118 may utilize the access keys 120 to verify the validity of the access token 116, such as in response to a request for an instance of the online content 108.

The various entities illustrated in the environment 100 are connected via network(s) 122. The network(s) 122 are representative of functionalities and infrastructures for enabling data transmission and other forms of communication among the entities of the environment 100. The network(s) 122 may assume a variety of different configurations, such as local area networks (LANs), wide area networks (WANs), the Internet, and so on. Functionalities discussed with reference to the environment 100 and/or other portions of the discussion herein may be implemented in a distributed environment (e.g., "over the cloud"), as further described in relation to FIG. 9.

Having described an example environment in which the techniques described herein may operate, consider now a discussion of some example implementation scenarios in accordance with one or more embodiments.

Example Implementation Scenarios

This section describes some example implementation scenarios for authentication for online content using an access token. For purpose of example only, the scenarios are described using various entities introduced above with reference to environment 100.

Figure 2:
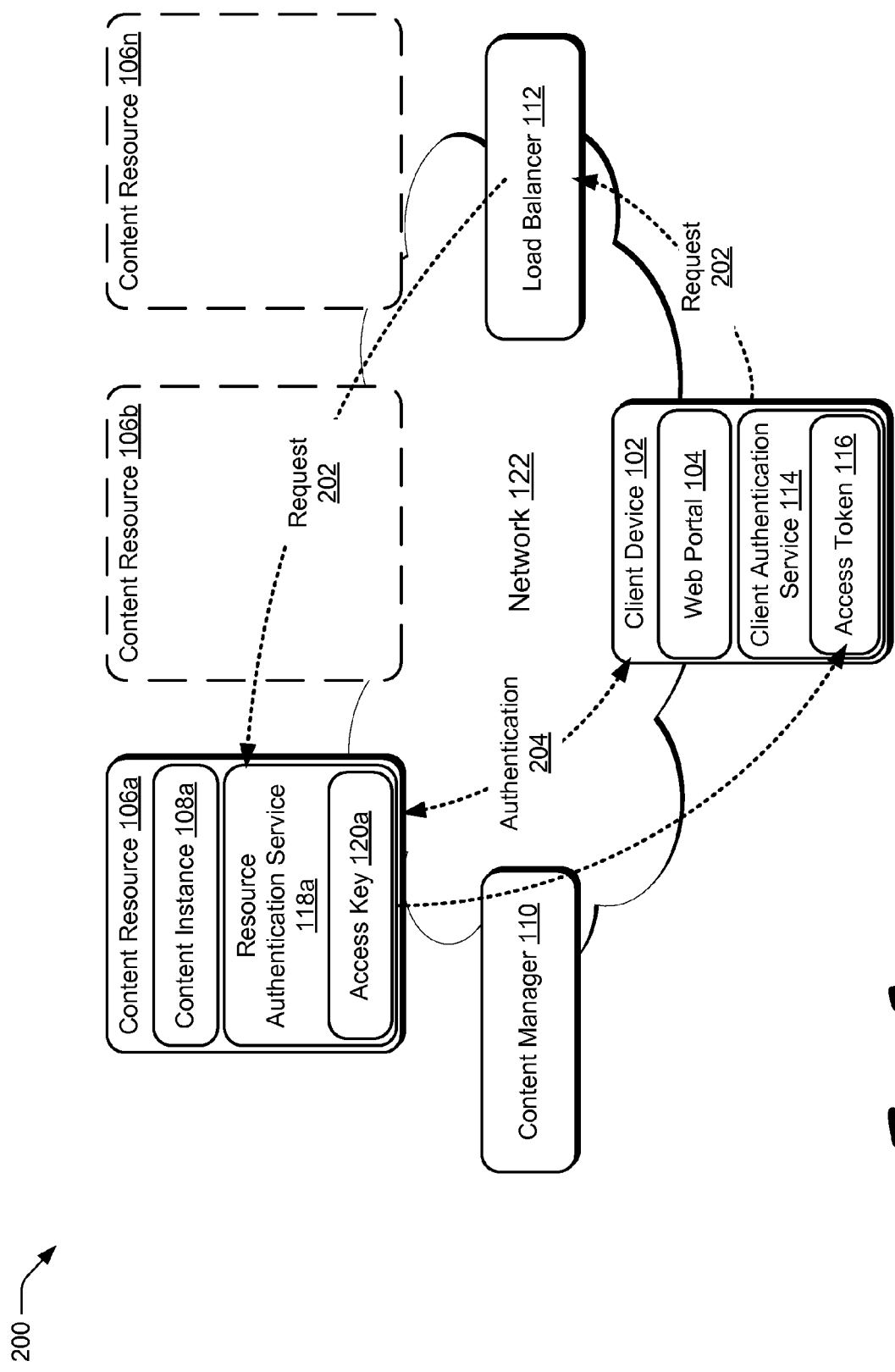
FIG. 2 illustrates an example implementation scenario for authenticating a user for access to online content in accordance with one or more embodiments.

FIG. 2 illustrates an example implementation scenario, generally at 200. The scenario 200 illustrates an example implementation for authenticating a user for access to online content in accordance with one or more embodiments.

In the scenario 200, the client device 102 submits a request 202 for an instance of online content. The web portal 104, for instance, requests an instance of the online content 108, such as in response to a user browsing to a website. The load balancer 112 routes the request 202 to one of the content resources 106. For purpose of this example, the load balancer 112 routes the request to the content resource 106a. It is to be appreciated, however, that the load balancer 112 may select any one of the content resources 106 based on a variety of considerations.

In response to the request 202, the content resource 106a and the client device 102 engage in an authentication procedure 204 to determine whether the client device 102 (e.g., a user of the device) is permitted to access the content instance 108a. For instance, the resource authentication service 118a requests user credentials from the client device 102. Examples of such user credentials include a username, a password, a bio-authentication factor, and so forth.

Further to the scenario 200, the client device 102 successfully authenticates with the content resource 106a. For instance, credentials provided by the client device 102 match a valid user account for a user permitted to access the content instance 108a. In at least some embodiments, the resource authentication service 118a may query the content manager 110 with the provided credentials to ascertain whether the credentials match a valid user account.

Responsive to the successful authentication, the resource authentication service 118a utilizes the access key 120a to generate the access token 116. Generally, the access token 116 includes information that indicates that the client device 102 has successfully authenticated for access to the content instance 108a.

According to one or more embodiments, the access key 120a represents a cryptographic key that the resource authentication service 118a uses to generate the access token 116. For instance, the resource authentication service 118a utilizes the access key 120a to encrypt a set of information utilizing a suitable encryption algorithm. Various types of information may be encrypted, such as user credentials, user identification information, device identification information for the client device 102, and so forth. Examples of algorithms that may be employed are discussed below.

The encrypted information is encapsulated in the access token 116, which is communicated to the client device 102. Also in response to the successful authentication, the client device 102 may be granted access to the content instance 108a. According to one or more embodiments, the access token 116 may be used for subsequent requests for access to online content. For instance, consider the following implementation scenario.

Figure 3:
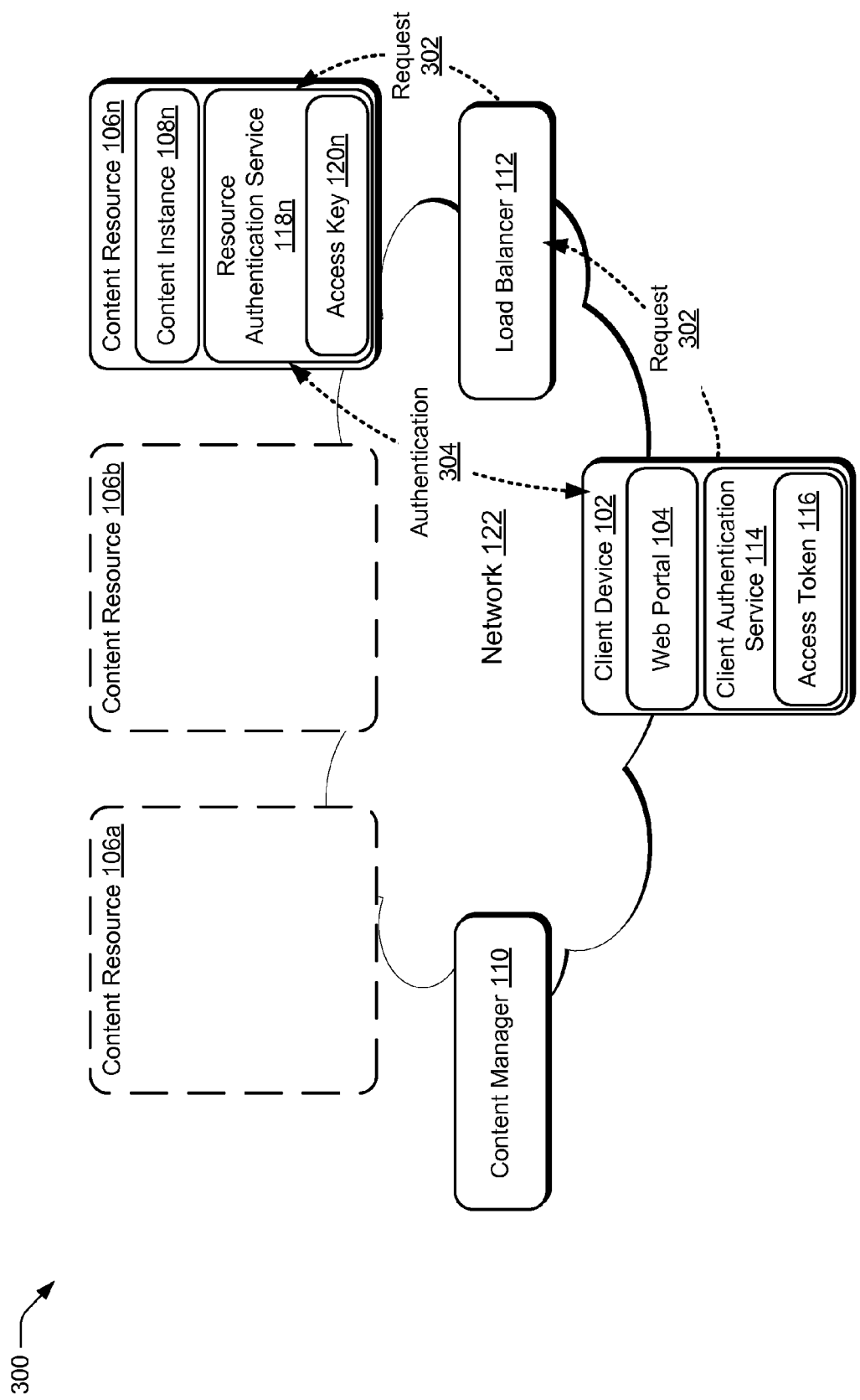
FIG. 3 illustrates an example implementation scenario for using an access token for authenticating a user for access to online content in accordance with one or more embodiments.

FIG. 3 illustrates an example implementation scenario, generally at 300. The scenario 300 illustrates an example implementation for using an access token for authenticating a user for access to online content in accordance with one or more embodiments. In at least some embodiments, the scenario 300 represents a request for online content that occurs subsequently to the request discussed above with reference to FIG. 2.

In the scenario 300, the client device 102 submits a request 302 for an instance of online content. In at least some embodiments, the request 302 is for the same online content requested in the scenario 200 discussed above, such as for the same web page, web service, and so forth. The load balancer 112 routes the request 302 to the content resource 106n. For instance, based on load considerations and/or resource availability information for different of the content resources 106, the load balancer 112 determines that the content resource 106n is a best candidate for serving the online content. It is to be appreciated, however, that the load balancer 112 may select any one of the content resources 106 based on a variety of considerations.

According to one or more embodiments, the request 302 may occur in direct response to a user request for online content, e.g., a user browsing to a website or other web resource may generate the request 302. Alternatively or additionally, the request 302 may occur as part of a redirect that occurs after communication of an instance of online content from a different content resource has begun. For instance, with reference to FIG. 2, consider that while a user is consuming and/or interacting with the content instance 108a, the load balancer 112 determines that a different resource is to be used to serve the online content. Accordingly, the request 302 is generated and communicated to the content resource 106n.

Various events may cause the load balancer 112 to locate a different resource for serving online content, such as a resource shortage at the content resource 106a, a software and/or hardware malfunction at the content resource 106a, and so forth. As discussed above, the content instance 108a of the content resource 106a and the content instance 108n of the content resource 108a correspond to instances of the same online content. Thus, the client device 102 may switch from receiving the content instance 108a to receiving the content instance 108n without a user perceiving an interruption in content service. Accordingly, techniques discussed herein enable user authentication when a user is redirected among different content sources.

In response to the request 302, the content resource 106n and the client device 102 engage in an authentication procedure 304 to determine whether the client device 102 (e.g., a user of the device) is permitted to access the content instance 108n. As part of the authentication procedure 304, the client device 102 communicates the access token 116 to the content resource 106n. In at least some embodiments, the access token 116 may be provided as part of the request 302. Alternatively or additionally, the access token 116 may be provided separately from the request 302, e.g., prior to and/or subsequent to the request 302 being communicated to the content resource 106n.

According to one or more embodiments, the client device 102 communicates the access token 116 to the content resource 106n independent of a user interaction as part of the authentication procedure. For instance, the client device 102 communicates the access token 116 to the content resource 106n in response to the request 302 and without querying the user for credentials and/or other authentication information.

Further to the scenario 300, the resource authentication service 118n processes the access token 116 to ascertain whether the client device 102 is permitted access to the content instance 108n. Examples ways for validating an access token are discussed below, such as with reference to FIG. 6. For instance, the resource authentication service 118n applies a cryptographic algorithm to the access token 116 using the access key 120n to validate the access token 116. In at least some embodiments, the cryptographic algorithm applied by the resource authentication service 120n is the same algorithm that was originally used to generate the access token 116. For instance, the algorithm is the same algorithm used by the resource authentication service 118a of the content resource 106a to generate the access token 116, as discussed above with reference to the scenario 200.

In an event that the access token 116 is validated, the client device 102 is permitted access to the content instance 108n. Otherwise, if the access token 116 is not validated, the client device 102 may be denied access to the content instances 108n.

Alternatively or additionally, if the access token 116 is not validated, the content resource 106n may prompt the client device 102 for user credentials. For instance, the content resource 106n may request that a user of the client device 102 provide some form of user credentials that may be compared to credentials for a valid user account, such as a username, password, and/or other form of credential.

The scenario 300 illustrates that one or more embodiments may be employed to authenticate a user for access to online content without requiring the user to input authentication credentials. Further, an access token generated for a particular content resource may be used to authenticate a user with multiple different content resources, e.g., a content resource with which the user has not previously authenticated. Thus, embodiments provide techniques for user authentication across multiple separate content resources and independent of user input of authentication credentials for some or all of the content resources.

Having discussed some implementation scenarios, consider now some example procedures in accordance with one or more embodiments.

Example Procedures

The following discussion describes some example procedures for authentication for online content using an access token in accordance with one or more embodiments. The example procedures may be employed in the environment 100 of FIG. 1, the system 900 of FIG. 9, and/or any other suitable environment.

Figure 4:
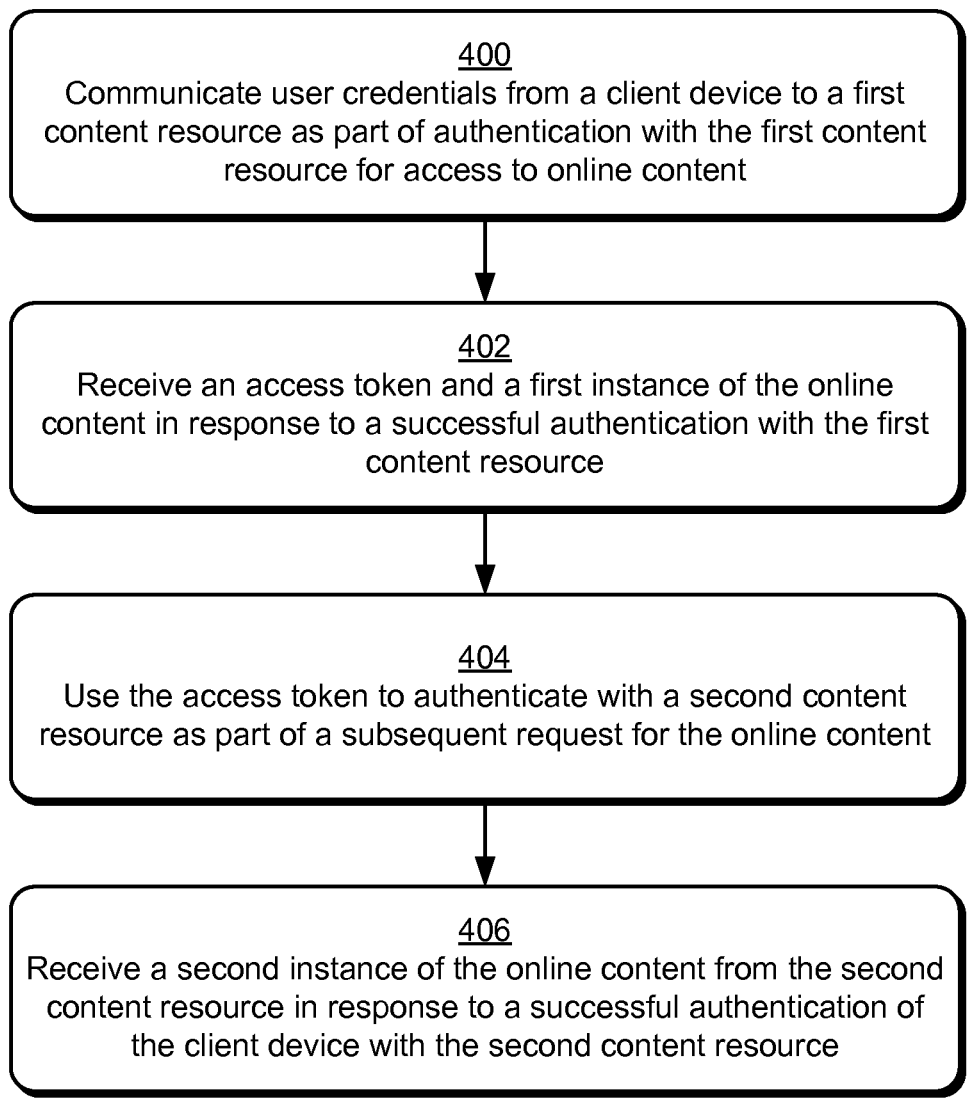
FIG. 4 is a flow diagram that describes steps in a method for authenticating a client device for access to online content in accordance with one or more embodiments.

FIG. 4 is a flow diagram that describes steps in a method in accordance with one or more embodiments. The method describes an example implementation for authenticating a client device for access to online content in accordance with one or more embodiments.

Step 400 communicates user credentials from a client device to a first content resource as part of authentication with the first content resource for access to online content. A client device, for instance, submits a request for online content, such as in response to user input requesting the online content. As discussed above, examples of online content include a web page, a web service, and/or various other types of content that may be retrieved from a web-based content resource.

In response to the request for online content, the first content resource requests user credentials from the client device, and the client device communicates the credentials to the first content resource. According to one or more embodiments, the user credentials are provided via user input, and the content resource may utilize the credentials to determine whether a valid user account exists that is permitted access to the online content.

Step 402 receives an access token and a first instance of the online content in response to a successful authentication with the first content resource. Example implementations of an access token and ways of generating an access token are detailed below. In at least some embodiments, the access token and the first instance of online content may be received together or separately.

Step 404 uses the access token to authenticate with a second content resource as part of a subsequent request for the online content. The subsequent request, for instance, occurs after the client device has received the first instance of content from the first content resource. As discussed above, the subsequent request may be routed to the second content resource by a load balancing functionality, e.g., the load balancer 112.

In at least some embodiments, the subsequent request may occur in response to user input. For instance, after a user is finished consuming the first instance of the online content, the user may return and wish to retrieve the online content again.

Alternatively, the subsequent request may occur independent of user input. For instance, while a user is consuming (e.g., viewing and/or interacting) with the first instance of the online content, the client device may be redirected (e.g., independent of user input) to the second content resource. As discussed above, the load balancer 112 may redirect the client device to the second content resource based on various events and/or factors.

According to one or more embodiments, authentication of the client device with the second content resource occurs independent of user input. For instance, the client device provides the access token as part of the subsequent request and/or in response to a request for user credentials from the second content resource. Further, authentication of the client device with the second content resource occurs even if the client device has not previously authenticated with the second content resource. The client device, for example, may provide no further authentication information to the second content resource other than the access token. Thus, in at least some embodiments, authentication of the client device with the second content resource is independent of any information about the client device that is cached and/or stored by the second content resource prior to the content resource receiving the access token.

Step 406 receives a second instance of the online content from the second content resource in response to a successful authentication of the client device with the second content resource. In at least some embodiments, the second instance of the online content represents a same or subsequent version of online content represented by the first instance of online content. The client device may output the second instance of online content.

Figure 5:
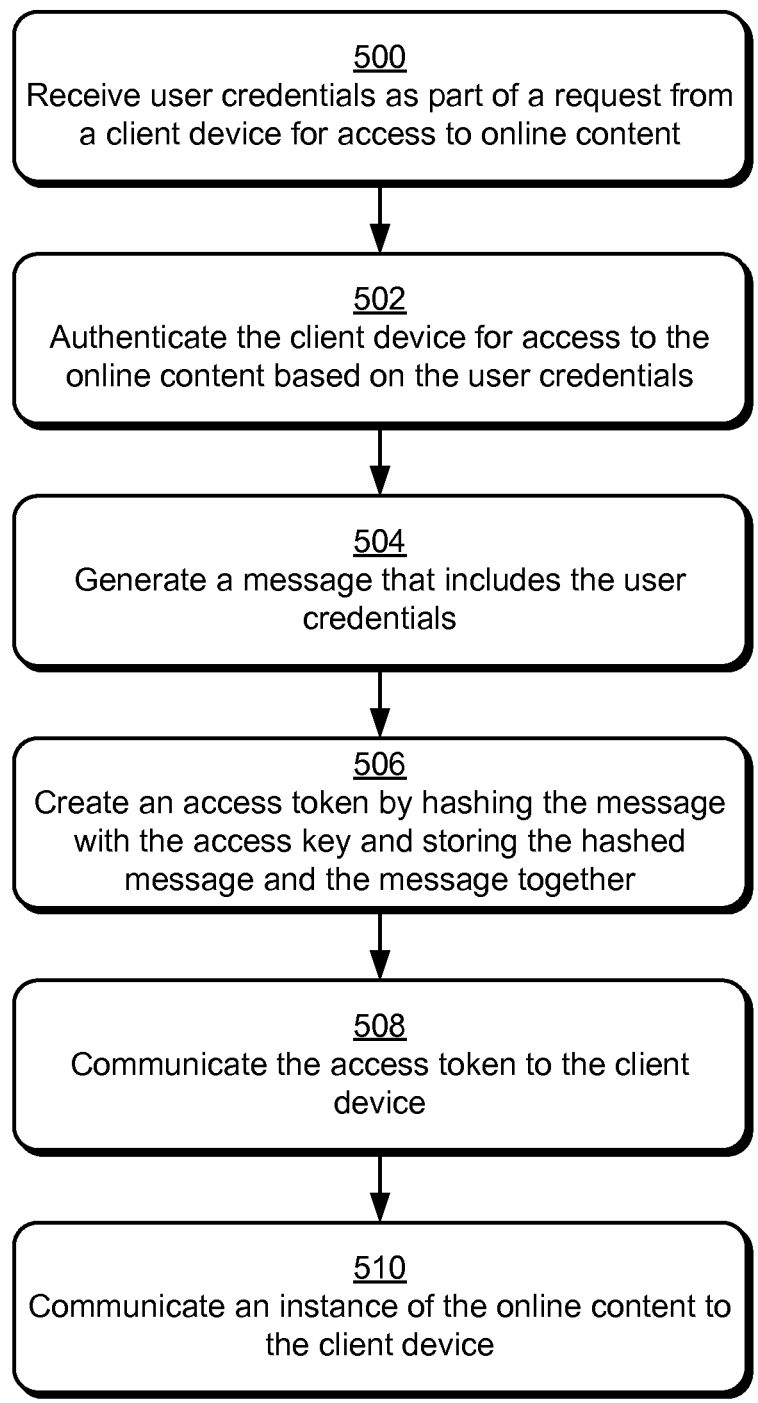
FIG. 5 is a flow diagram that describes steps in a method for generating an access token in accordance with one or more embodiments.

FIG. 5 is a flow diagram that describes steps in a method in accordance with one or more embodiments. The method describes an example implementation for generating an access token in accordance with one or more embodiments.

Step 500 receives user credentials as part of a request from a client device for access to online content. One of the content resources 106, for instance, receives a username, password, and/or other user credentials from a client device further to a request for online content.

Step 502 authenticates the client device for access to the online content based on the user credentials. For example, a content resource compares the user credentials to a collection of user accounts and determines that the credentials match an existing user account. Alternatively, the credentials can be used to create a new user account that may access the online content.

Step 504 generates a message that includes the user credentials. Various types of user information can be embedded in the message, such as a user identifier, a device identifier for the client device, and so forth.

In at least some embodiments, various other types of information can be embedded in the message, such as a date on which the message was created, an expiration date and/or time period for the message, an identifier for online content being requested, and so forth. A variety of other types and instances of information not expressly discussed herein may be embedded in the message according to one or more embodiments.

In an example embodiment, the message is implemented as a JavaScript Object Notation (JSON) web token (JWT). Thus, information embedded in the message can be configured as a claims set of the JWT.

For instance, consider that the following JWT claims set is generated:

---

{"alg":"HMAC"}
{"id":"bab31328-2939-4714-98c3-
d06fab41d18c","created_at":"1310577393824","expires_in":
"86400000","user_id":"monitor@EnterpriseID"}

---

According to the JWT protocol, the claims set is processed to generate a JWT, which includes user credentials.

Step 506 creates an access token by hashing the message with an access key and storing the hashed message and the message together. In at least some embodiments, the hashed message is generated using a hash-based message authentication code (HMAC) algorithm with the access key and the message as input to the algorithm. The access key, for instance, is implemented as a private cryptographic key that is appended and/or combined with the data of the message prior to the HMAC algorithm being applied, e.g., for purpose of signing the access token. Thus, in at least some embodiments, the access token includes both the message (e.g., in an unhashed form) and a message authentication code (MAC) generated using the message and the access key. As an optional extension, the message and/or the MAC may be further encrypted using an encryption algorithm.

Step 508 communicates the access token to the client device. A content resource 106, for instance, may communicate the access token to the client device 102. Further, the content resource 106 may not store the access token, e.g., after the access token is communicated to the client device 102.

Step 510 communicates an instance of the online content to the client device. In at least some embodiments, the access token may be communicated along with an instance of the online content, and/or prior to or after communicating the instance of the online content.

According to one or more embodiments, the access token may be utilized to authenticate the client device with another content resource. For instance, consider the following example procedure.

Figure 6:
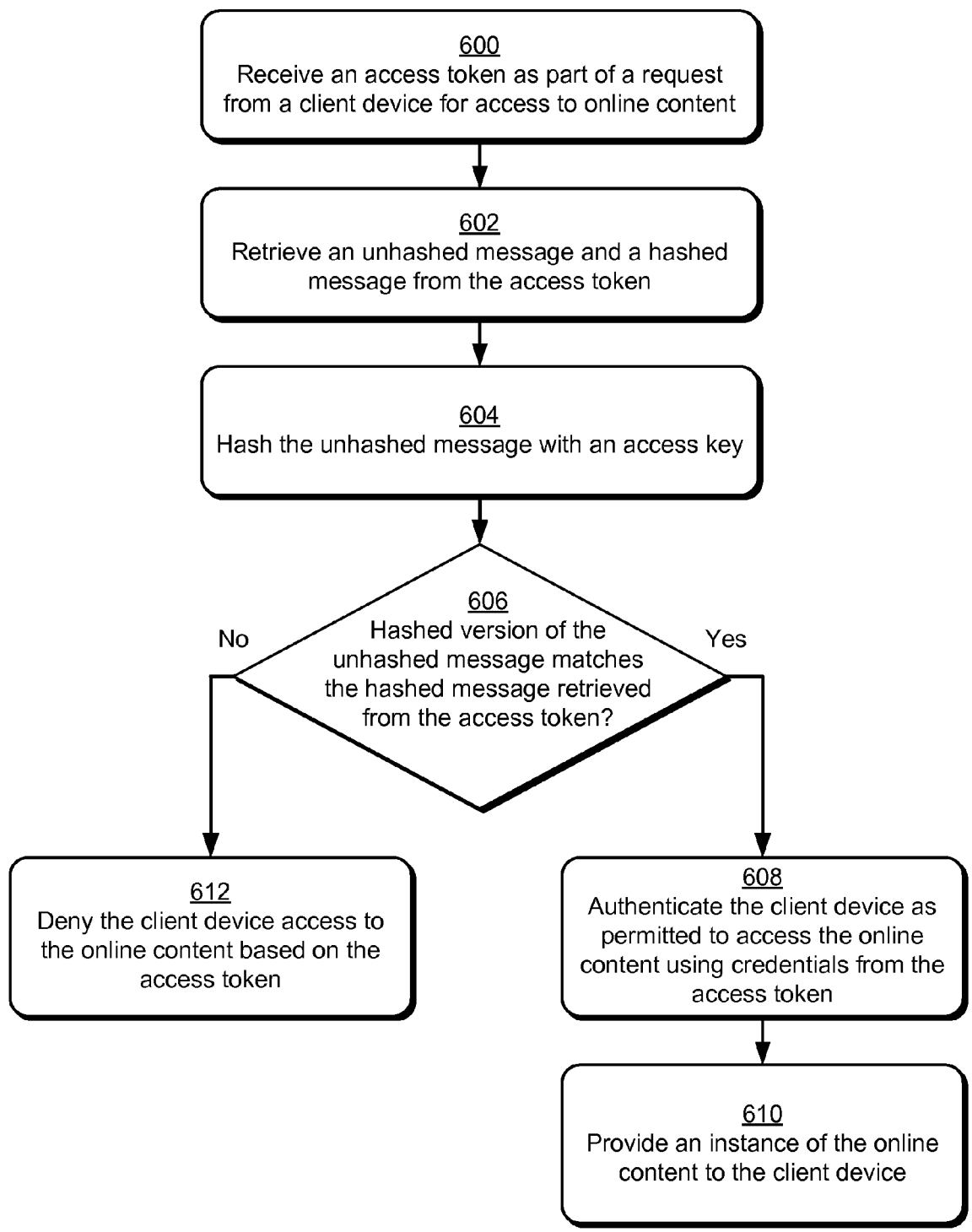
FIG. 6 is a flow diagram that describes steps in a method for authentication using an access token in accordance with one or more embodiments.

FIG. 6 is a flow diagram that describes steps in a method in accordance with one or more embodiments. The method describes an example implementation for authentication using an access token in accordance with one or more embodiments.

Step 600 receives an access token as part of a request from a client device for access to online content. In at least some embodiments, the request is received by a content resource that is different than a content resource that generated the access token. According to one or more embodiments, the request may be received by a content resource with which the client device has not previously authenticated. The content resource, for example, may not have authentication information (other than the received access token) for the client device stored locally. Further, the content resource may not have previously generated an access token for the client device, e.g., prior to receiving the access token with the request.

Step 602 retrieves an unhashed message and a hashed message from the access token. A content resource, for instance, parses the access token to identify an unhashed message (e.g., a JWT) and a hashed message included in the access token. In at least some embodiments, the access token is encrypted when it is received, and thus the access token is decrypted prior to retrieving the unhashed message and the hashed message.

Step 604 hashes the unhashed message with an access key. In least some embodiments, the access key matches (e.g., is the same as) the access key used to generate the hashed message, such as discussed above with reference to FIG. 5. Using the access key, the unhashed message is hashed via a hash function, such as the hash function used to generate the hashed message as discussed with reference to FIG. 2. An HMAC function, for instance, is used to hash the unhashed message.

Step 606 ascertains whether the hashed version of the unhashed message matches the hashed message retrieved from the access token. Various types of character matching algorithms, for instance, may be used to compare the hashed version of the unhashed message with the hashed message retrieved from the access token.

If the hashed version of the unhashed message matches the hashed message retrieved from the access token ("Yes"), step 608 authenticates the client device as permitted to access the online content using credentials from the access token. For instance, user credentials from the access token are matched to a user account.

Step 610 provides an instance of the online content to the client device. The content resource, for instance, streams and/or uploads the online content to the client device. In at least some embodiments, the instance of online content is an instance of the same online content discussed above with reference to FIGS. 4 and/or 5.

If the hashed version of the unhashed message does not match the hashed message retrieved from the access token ("No"), step 612 denies the client device access to the online content based on the access token. According to one or more embodiments, various events may cause the hashed version of the unhashed message to not match the hashed message retrieved from the access token. For instance, an unauthorized party may be attempting to access the online content using the access token, and thus may attempt to generate a hashed message included in the access token using an incorrect access key.

According to one or more embodiments, the procedure described with reference to FIG. 6 may be implemented to authenticate with a content resource that is different than a content resource that generated the access token used in the authentication process. The procedure, for instance, may be implemented as part of a request for online content that occurs subsequent to the procedure discussed above with reference to FIG. 5. In at least some embodiments, the procedure of FIG. 6 may be implemented multiple times and/or with multiple different content resources to access online content, e.g., instances of the same online content. Thus, the access token discussed herein may be utilized for multiple different authentication procedures and with multiple different content resources. Further, the procedure may be implemented via a content resource that has no authentication history with a particular user account, e.g., for a user account associated with the received access token.

According to one or more embodiments, an access token may expire. For instance, consider the following example procedure.

Figure 7:
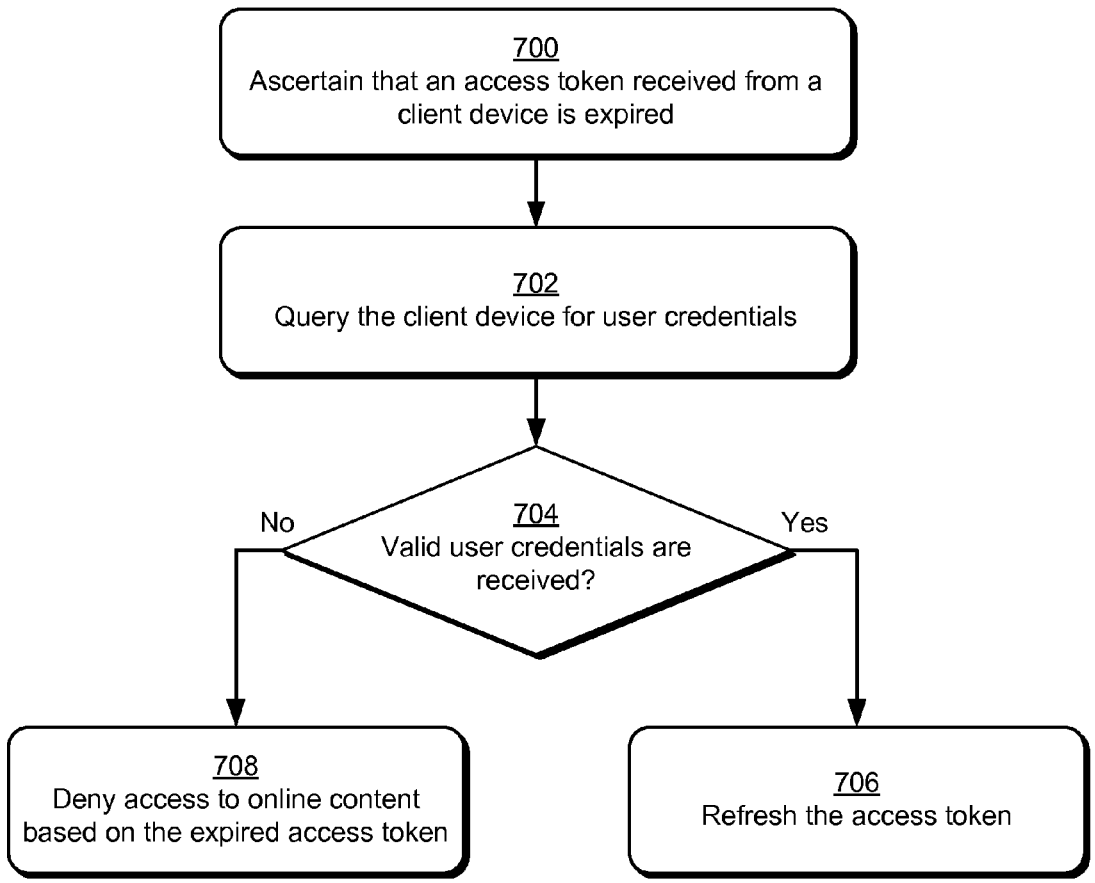
FIG. 7 is a flow diagram that describes steps in a method for refreshing an access token in accordance with one or more embodiments.

FIG. 7 is a flow diagram that describes steps in a method in accordance with one or more embodiments. The method describes an example implementation for refreshing an access token in accordance with one or more embodiments.

Step 700 ascertains that an access token received from a client device is expired. As discussed above, a message included in an access token may specify an expiration date and/or an elapsed time after which the access token expires. Accordingly, in at least some embodiments, an access token may be inspected during an authentication process to ascertain whether the access token is expired. For instance, during the procedure discussed above with reference to FIG. 6, the access token (e.g., the message included with the token) may be inspected to determine whether the token is expired. This inspection may occur, for instance, between steps 606 and 608 of the procedure of FIG. 6.

Step 702 queries the client device for user credentials. The client device is queried, for instance, in response to determining that the access token is expired. In at least some embodiments, a content resource 106 can submit a query for user credentials to the client device 102.

Step 704 ascertains whether valid user credentials are received. User credentials that are received, for instance, are compared to user credentials for valid user accounts.

If valid user credentials are received ("Yes"), step 706 refreshes the access token. For instance, an access token for a user account can be generated and communicated to the client device, such as via the procedure discussed above with reference to FIG. 5. Alternatively, an expiration for the expired access token can be reset to a future expiration date and/or time period.

If valid user credentials are not received ("No"), step 708 denies access to online content based on the expired access token. For instance, an attempt to utilize the expired access token to authenticate for access to online content will fail.

According to one or more embodiments, an access token may be revoked. For instance, consider the following example procedure.

Figure 8:
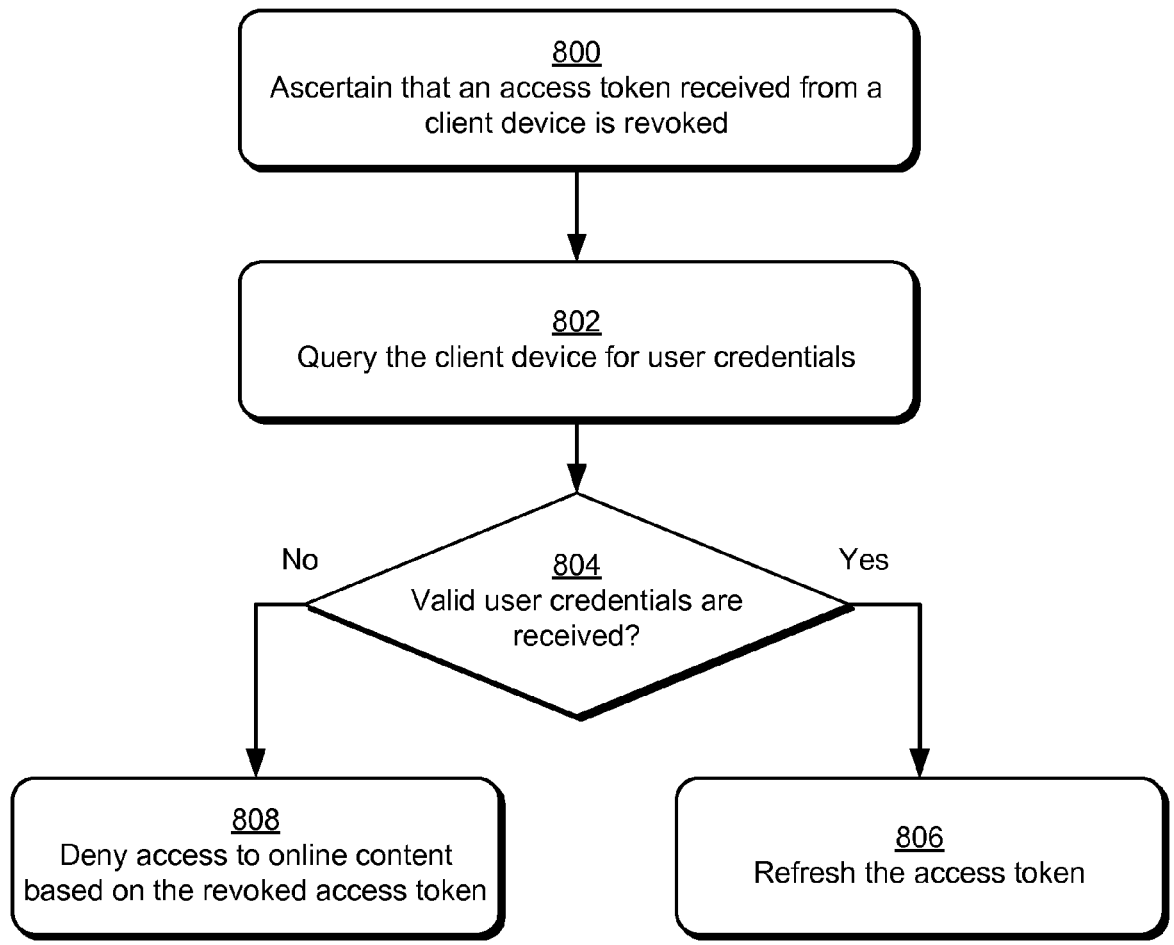
FIG. 8 is a flow diagram that describes steps in a method for attempting to refresh a revoked access token in accordance with one or more embodiments.

FIG. 8 is a flow diagram that describes steps in a method in accordance with one or more embodiments. The method describes an example implementation for attempting to refresh a revoked access token in accordance with one or more embodiments.

Step 800 ascertains that an access token received from a client device is revoked. An authority with authorization to revoke access tokens may notify various other entities (e.g., the content resources 106) that a particular access token has been revoked. Examples of such an authority include a malware detection service, a content management service (e.g., the content manager 110), a network security service, and so forth.

An access token may be revoked for various reasons, such as security of a token being compromised, a user account being cancelled, and so on. For instance, during the procedure discussed above with reference to FIG. 6, the access token (e.g., the message included with the token) may be inspected to determine whether the token is revoked. This inspection may occur, for instance, between steps 606 and 608 of the procedure of FIG. 6.

Step 802 queries the client device for user credentials. The client device is queried, for instance, in response to determining that the access token is revoked. In at least some embodiments, a content resource 106 can submit a query for user credentials to the client device 102.

Step 804 ascertains whether valid user credentials are received. User credentials that are received, for instance, are compared to user credentials for valid user accounts.

If valid user credentials are received ("Yes"), step 806 refreshes the access token. For instance, a new access token for a user account can be generated and communicated to the client device, such as via the procedure discussed above with reference to FIG. 5.

If valid user credentials are not received ("No"), step 808 denies access to online content based on the expired access token. For instance, an attempt to utilize the revoked access token to authenticate for access to online content will fail.

Having discussed some example procedures, consider now a discussion of an example system and device in accordance with one or more embodiments.

Example System and Device

Figure 9:
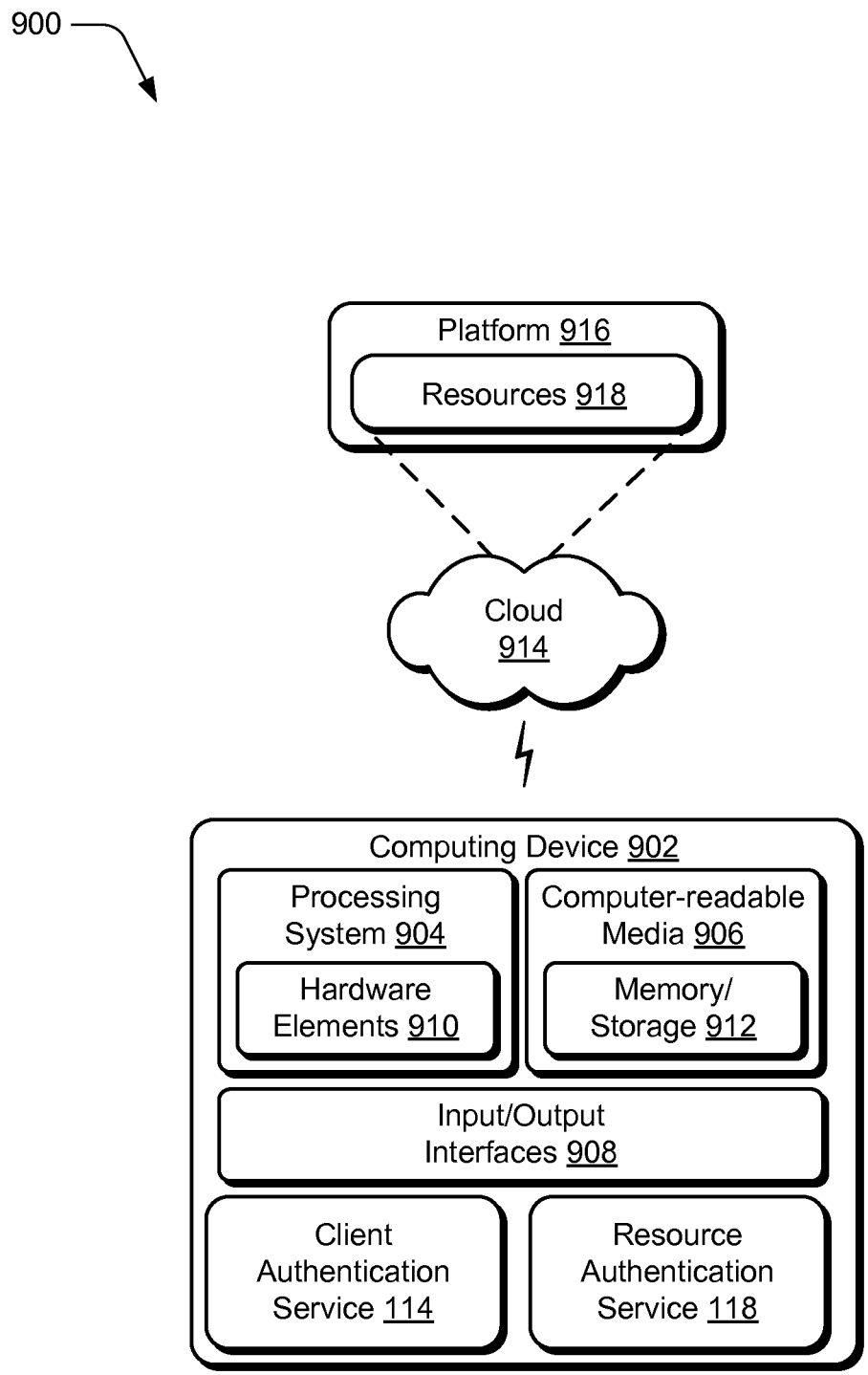
FIG. 9 illustrates an example system and computing device as described with reference to FIG. 1, which are configured to implement embodiments of techniques described herein.

FIG. 9 illustrates an example system generally at 900 that includes an example computing device 902 that is representative of one or more computing systems and/or devices that may implement the various techniques described herein. This is illustrated through inclusion of the client authentication service 114 and the resource authentication service 118, which may be employed to implement techniques for authentication for online content using an access token described discussed herein. The computing device 902 may be, for example, a server of a service provider, a device associated with a client (e.g., a client device), an on-chip system, and/or any other suitable computing device or computing system. In at least some implementations, the computing device 902 represents an example implementation of various devices of the environment 100 discussed in FIG. 1.

The computing device 902 as illustrated includes a processing system 904, one or more computer-readable media 906, and one or more I/O interfaces 908 that are communicatively coupled and/or connected, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 are illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "service," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

Discussed herein are a number of methods that may be implemented to perform techniques discussed herein.

Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100, the system 900, and so on.

CONCLUSION

Techniques for authentication for online content using an access token are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
   one or more processors; and
   one or more computer-readable storage device storing computer-executable instructions that, responsive to execution by the one or more processors, cause the system to perform operations including:
      authenticating, at an online content resource, a client device for access to online content based on user credentials received from the client device as part of a request for access to the online content;
      generating a message that includes the user credentials and a common access key held by multiple content resources that serve the online content;
      creating an access token by hashing the message with the common access key to generate a first hashed message and by storing the first hashed message and an unhashed version of the message together as part of the access token;
      communicating the access token and an instance of the online content to the client device;
      removing, subsequent to the communicating, the access token and the message from the online content resource so that the access token is not stored by the online content resource;
      receiving, subsequent to the removing, the access token as part of a subsequent request from the client device for access to the online content; and
      authenticating the client device as permitted to access the online content as part of the subsequent request using the common access key and the access token and independent of any information about the client device stored by the online content resource by:
         retrieving the first hashed message and the unhashed version of the message from the access token;
         hashing the unhashed version of the message with the common access key to generate a second hashed message; and
         ascertaining that the second hashed message matches the first hashed message retrieved from the access token.

2. A system as recited in claim 1, wherein said generating further comprises generating the message to include a date on which the message is generated.

3. A system as recited in claim 1, wherein said generating further comprises generating the message to include an identifier for online content being requested.

4. A system as described in claim 1, wherein said authenticating and said creating are performed via a content resource configured to serve an instance of the online content independent of a resource that generates the online content.

5. A system as described in claim 1, wherein the message further includes one or more of an indication of an elapsed time after which the access token will expire or a date after which the access token will expire.

6. A system as described in claim 1, wherein the common access key is added to the message prior to said hashing the message.

7. A system as described in claim 1, wherein the operations further comprise encrypting the access token prior to said communicating.

8. A system as described in claim 1, wherein the operations further comprise:
ascertaining that the access token is one of expired or revoked; and
causing, in response to said ascertaining, the access token to be refreshed.

9. A computer-implemented method, comprising:
authenticating, at an online content resource and at a first time, a client device for access to online content based on user credentials received from the client device as part of a request for access to the online content;
generating a message that includes the user credentials and a common access key held by multiple content resources;
creating an access token by hashing the message with the common access key to generate a first hashed message and by storing the first hashed message and an unhashed version of the message together as part of the access token;
communicating the access token and an instance of the online content to the client device;
removing, subsequent to the communicating, the access token and the message from the online content resource so that the access token is not stored by the online content provider;
receiving, subsequent to the removing, the access token as part of a subsequent request from the client device for access to the online content;
retrieving the first hashed message and the unhashed version of the message from the access token;
hashing the unhashed version of the message with the common access key to generate a second hashed message;
ascertaining that the second hashed message matches the first hashed message retrieved from the access token; and
authenticating the client device at a second time as permitted to access the online content as part of the subsequent request and using credentials from the access token.

10. A computer-implemented method as recited in claim 9, wherein said authenticating and said creating are performed via a content resource configured to serve an instance of the online content independent of a resource that generates the online content.

11. A computer-implemented method as recited in claim 9, wherein the message further includes one or more of an indication of an elapsed time after which the access token will expire or a date after which the access token will expire.

12. A computer-implemented method as recited in claim 9, wherein the common access key is added to the message prior to said hashing the message.

13. A computer-implemented method as recited in claim 9, further comprising encrypting the access token prior to said communicating.

14. A computer-implemented method as recited in claim 9, further comprising:
ascertaining that the access token is one of expired or revoked; and
causing, in response to said ascertaining, the access token to be refreshed.

15. One or more computer-readable storage device storing instructions that are executed to perform operations comprising:
authenticating, at an online content resource, a client device for access to online content based on user credentials received from the client device as part of a request for access to the online content;
generating a message that includes the user credentials and a common access key held by multiple content resources that serve the online content;
creating an access token by hashing the message with the common access key to generate a first hashed message and by storing the first hashed message and an unhashed version of the message together as part of the access token;
communicating the access token and an instance of the online content to the client device;
removing, subsequent to the communicating, the access token and the message from the online content resource;
receiving, subsequent to the removing, the access token as part of a subsequent request from the client device for access to the online content; and
authenticating the client device as permitted to access the online content as part of the subsequent request using the common access key and the access token and independent of any information maintained about the client device by the multiple content resources by:
retrieving the first hashed message and the unhashed version of the message from the access token;
hashing the unhashed version of the message with the common access key to generate a second hashed message; and
ascertaining that the second hashed message matches the first hashed message retrieved from the access token.

16. One or more computer-readable storage device as recited in claim 15, wherein said authenticating and said creating are performed via a content resource configured to serve an instance of the online content independent of a resource that generates the online content.

17. One or more computer-readable storage device as recited in claim 15, wherein the message further includes one or more of an indication of an elapsed time after which the access token will expire or a date after which the access token will expire.

18. One or more computer-readable storage device as recited in claim 15, wherein the common access key is added to the message prior to said hashing the message.

19. One or more computer-readable storage device as recited in claim 15, wherein the operations further comprise encrypting the access token prior to said communicating.

20. One or more computer-readable storage device as recited in claim 15, wherein the operations further comprise:

ascertaining that the access token is one of expired or revoked; and causing, in response to said ascertaining, the access token to be refreshed.

* * * * *